United States Patent
McCuller (10) Patent No.: US 7,912,716 B2
(45) Date of Patent: Mar. 22, 2011

(54) GENERATING WORDS AND NAMES USING N-GRAMS OF PHONEMES

(75) Inventor: Patrick McCuller, San Diego, CA (US)

(73) Assignee: Sony Online Entertainment LLC, San Diego, CA (US)

(*) Notice: Subject to any disclaimer, the term of this patent is extended or adjusted under 35 U.S.C. 154(b) by 550 days.

(21) Appl. No.: 11/245,537

(22) Filed: Oct. 6, 2005

(65) Prior Publication Data

US 2007/0083369 A1    Apr. 12, 2007

(51) Int. Cl.
*G10L 15/04* (2006.01)

(52) U.S. Cl. ............ 704/254; 704/9; 704/251; 704/252; 704/257; 704/10

(58) Field of Classification Search ............... 704/9, 10, 704/251–254, 257
See application file for complete search history.

(56) References Cited

U.S. PATENT DOCUMENTS

| | | | | |
|---|---|---|---|---|
| 5,613,034 A | * | 3/1997 | Ney et al. | 704/251 |
| 5,621,859 A | * | 4/1997 | Schwartz et al. | 704/256 |
| 5,799,319 A | | 8/1998 | Atkins | |
| 2003/0110035 A1 | * | 6/2003 | Thong et al. | 704/254 |
| 2004/0059574 A1 | * | 3/2004 | Ma et al. | 704/254 |
| 2004/0230966 A1 | | 11/2004 | Morris et al. | |
| 2005/0004915 A1 | | 1/2005 | Hermand | |
| 2005/0197838 A1 | * | 9/2005 | Lin et al. | 704/260 |
| 2005/0256715 A1 | * | 11/2005 | Okimoto et al. | 704/257 |
| 2005/0267755 A1 | * | 12/2005 | Suontausta | 704/254 |
| 2007/0206017 A1 | * | 9/2007 | Johnson et al. | 345/473 |

OTHER PUBLICATIONS

John Fry, "N-Gram Language Models," Linguistics 165: Computers and Written language, Spring 2004, San Jose State University, (http://www2.sjsu.edu/faculty/fry/165/ngram4s.pdf).
Internet website http://www.ruf.rice.edu/~pound/#werd.
Internet website http://www.speech.cs.cmu.edu/cgibin/cmudict.
International Search Report/Written Opinion issued in PCTUS2006/39232 on Jul. 8, 2008.

* cited by examiner

*Primary Examiner* — Richemond Dorvil
*Assistant Examiner* — Leonard Saint Cyr
(74) *Attorney, Agent, or Firm* — Procopio, Cory, Hargreaves & Savitch LLP (57) ABSTRACT

Generating words and/or names, comprising: receiving at least one corpus based on a given language; generating a plurality of N-grams of phonemes and a plurality of frequencies of occurrence using the corpus, such that each frequency of occurrence corresponds to a respective pair of phonemes and indicates the frequency of the second phoneme in the pair following the first phoneme in the pair; generating a phoneme tree using the plurality of N-grams of phonemes and the plurality of frequencies of occurrence; performing a random walk on the phoneme tree using the frequencies of occurrence to generate a sequence of phonemes; and mapping the sequence of phonemes into a sequence of graphemes.

33 Claims, 7 Drawing Sheets

| Column A | Column B | Column C |
|---|---|---|
| D | a | n |
| C | e | fi |
| F | o | l |
| N | u | p |

FIG. 1

| Column A | Column B | Column C |
|---|---|---|
| D | a 50% | n |
| C | e 20% | fi |
| F | o 20% | l |
| N | u 10% | p |

FIG. 2

Table for A

| B | 66 % |
|---|---|
| C | 34 % |

Table for B

| A | 100 % |
|---|---|

Table for C

| | |
|---|---|

| Table for /f/ | /U/ | 100 % |

| Table for /b/ | /l/ | 50 % |
| | /a/ | 50 % |

| Table for /a/ | /r/ | 50 % |
| | /s/ | 50 % |

| Table for /s/ | /r/ | 100 % |

| Table for /l/ | /a/ | 100 % |

FIG. 5

Tree for /f/

FIG. 6A

Tree for /b/

FIG. 6B

Tree for /a/

FIG. 6C

Tree for /s/

FIG. 6D

Tree for /l/

GENERATING WORDS AND NAMES USING N-GRAMS OF PHONEMES

CROSS-REFERENCE TO RELATED APPLICATIONS

This application is related to U.S. patent application Ser. No. 11/102,519 entitled "System for Generating and Selecting Names", filed May 10, 2005. The disclosure of this U.S. patent application is hereby incorporated by reference.

BACKGROUND

The present invention relates to generating words and/or names, and more specifically, to using N-grams of phonemes to generate such words and/or names.

Words and names are often generated using methods that combine language units, such as letters or syllables. However, these methods usually require manual coding and tuning, which involves a time-consuming manual selection of language units, and an even more time-consuming setting of frequencies of occurrence of these units. Additional time may be spent annotating units, such as "this unit occurs only at the beginning of a word". Although words generated with the above-described methods are often acceptable in quality, the produced results are sometimes unsatisfactory and tend to be unpronounceable and alien sounding. This is particularly true for English and other languages with complex grapheme-to-phoneme mappings.

SUMMARY

Implementations of the present invention provide methods and apparatus to generate words and names using N-grams of phonemes.

In one implementation, a method for generating words and/or names is disclosed. The method comprises: receiving at least one corpus based on a given language; generating a plurality of N-grams of phonemes and a plurality of frequencies of occurrence using the corpus, such that each frequency of occurrence corresponds to a respective pair of phonemes and indicates the frequency of the second phoneme in the pair following the first phoneme in the pair; generating a phoneme tree using the plurality of N-grams of phonemes and the plurality of frequencies of occurrence; performing a random walk on the phoneme tree using the frequencies of occurrence to generate a sequence of phonemes; and mapping the sequence of phonemes into a sequence of graphemes.

In another implementation, an apparatus for generating words and/or names is disclosed. The apparatus comprises: means for receiving at least one corpus based on a given language; first means for generating a plurality of N-grams of phonemes and a plurality of frequencies of occurrence using the corpus, such that each frequency of occurrence corresponds to a respective pair of phonemes and indicates the frequency of the second phoneme in the pair following the first phoneme in the pair; second means for generating a phoneme tree using the plurality of N-grams of phonemes and the plurality of frequencies of occurrence; means for performing a random walk on the phoneme tree using the frequencies of occurrence to generate a sequence of phonemes; and means for mapping the sequence of phonemes into a sequence of graphemes.

In another implementation, another apparatus for generating words and/or names is disclosed. The apparatus comprises: an input/output interface to receive at least one corpus based on a given language; a processor configured to decompose the corpus into a sequence of words, to generate a plurality of N-grams of phonemes and a plurality of frequencies of occurrence using the sequence of words and a dictionary, such that each frequency of occurrence corresponds to a respective pair of phonemes and indicates the frequency of the second phoneme in the pair following the first phoneme in the pair, and to generate a phoneme tree using the plurality of N-grams of phonemes and the plurality of frequencies of occurrence; a storage for storing the dictionary, the phoneme tree, and a phoneme-to-grapheme lookup table, wherein the processor retrieves the phoneme tree to perform a random walk on the phoneme tree using the frequencies of occurrence to generate a sequence of phonemes, and maps the sequence of phonemes into a sequence of graphemes using the phoneme-to-grapheme lookup table.

In another implementation, a computer program, stored in a tangible storage medium, for generating words and/or names is disclosed. The program comprises executable instructions that cause a computer to: receive at least one corpus based on a given language; generate a plurality of N-grams of phonemes and a plurality of frequencies of occurrence using the corpus, such that each frequency of occurrence corresponds to a respective pair of phonemes and indicates the frequency of the second phoneme in the pair following the first phoneme in the pair; generate a phoneme tree using the plurality of N-grams of phonemes and the plurality of frequencies of occurrence; perform a random walk on the phoneme tree using the frequencies of occurrence to generate a sequence of phonemes; and map the sequence of phonemes into a sequence of graphemes.

DESCRIPTION

Implementations of the present invention provide methods and apparatus for generating words and names using N-grams of phonemes.

As used in this disclosure, the following terms are defined as follows:

Corpus—a body of text used as an input to the word generator. For example, writings of Shakespeare can be used as a corpus for English.

Phoneme—a sound made in speech, such as "ch". For example, a phoneme for the sound of "s" is written as /s/ to distinguish it from the letter "s".

Grapheme—a graphical representation of a sound. For example, the grapheme of letter "k" represents the sound /k/. In English, a one-to-one mapping between a grapheme and a phoneme does not always exist. For example, the sound /k/ can be written as "k", "c", "ck", "q", etc. Thus, a single grapheme can stand for several different phonemes.

N-gram—a sequence of language units, such as words, syllables, phonemes, sentences, etc. A bi-gram has a sequence length of 2 (e.g., "s"-"t"), while a tri-gram has a sequence length of three (e.g., "a"-"b"-"r").

Phonestheme—a phoneme with strong semantic class associations.

Sonority—a trait of phonemes that is essentially a relative scale of the loudness of phonemes.

Syllable—an organization of phonemes in sequence. There are approximately 140 syllables in Japanese but more than 15,000 in English.

Syllabify—to compose a word from its phonemes into syllables.

A typical word generator may receive letters, frequencies of occurrence of letters, annotations, length ranges, and disallowed combinations of letters as inputs. The word generator combines the received letters according to the annotations and the frequencies until the combination of letters reaches a desired length. The combination is then checked against the list of disallowed combinations of letters to filter out, for example, combinations that are unpronounceable or profane. This process of combining the letters is generally referred to as a "Menu" approach (e.g., similar to ordering food from a restaurant menu).

Figure 1:
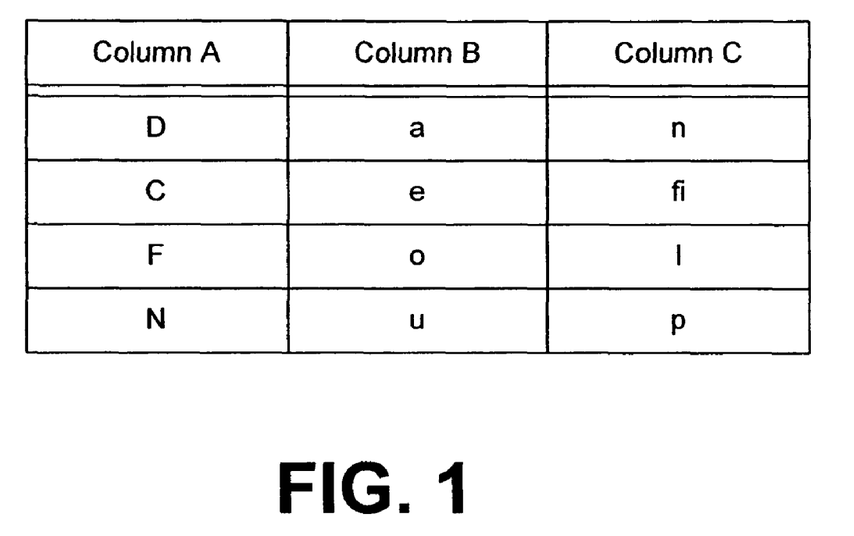
FIG. 1 shows a table of selectable language units arranged in columns.

In a pure Menu approach, the word generator consecutively, randomly selects from columns or tables of language units (e.g., letters, syllables, and/or combinations of letters and syllables). Referring to the table in FIG. 1, one language unit is selected from each column. For example, letter "C" is selected from column A, letter "u" is selected from column B, and letter "p" is selected from column C to form a word "Cup". Other combinations of language units, such as "Dan", "Fefi", and "Nen" can be formed using the table in FIG. 1 and the Menu approach.

Figure 2:
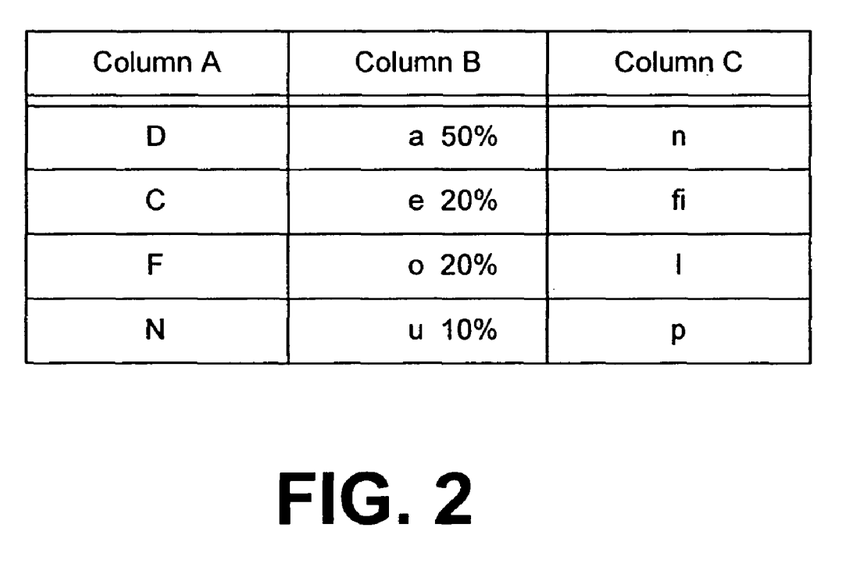
FIG. 2 shows another table of selectable language units arranged in columns with a middle column including frequencies of occurrence of the language units.

In a modified Menu approach, the word generator may weight the columns and/or may vary which columns are selected. Thus, referring to the table in FIG. 2, column B may also include frequencies of occurrence of letters in addition to the letters. In this case, the word generator selects "a" from column B 50% of the time, "e" 20% of the time, "o" 20% of the time, and "u" 10% of the time. Additionally, it may take annotations and other rules into account.

An alternative approach to generating words includes generating a frequency table for letters from a given corpus (i.e., a body of text, which is used as an input to the word generator, fairly representative of the language in which words are generated), detecting letters, and determining how often a given letter follows other letters. For example, assuming that a corpus includes, in its simplest form, a sequence of letters "ABABAC", the word generator parses the sequence into a set of tables, one for each letter (i.e., A, B, or C). Thus, each letter includes an associated table, which maps letters following each letter to their frequency of occurrence.

Figure 3:
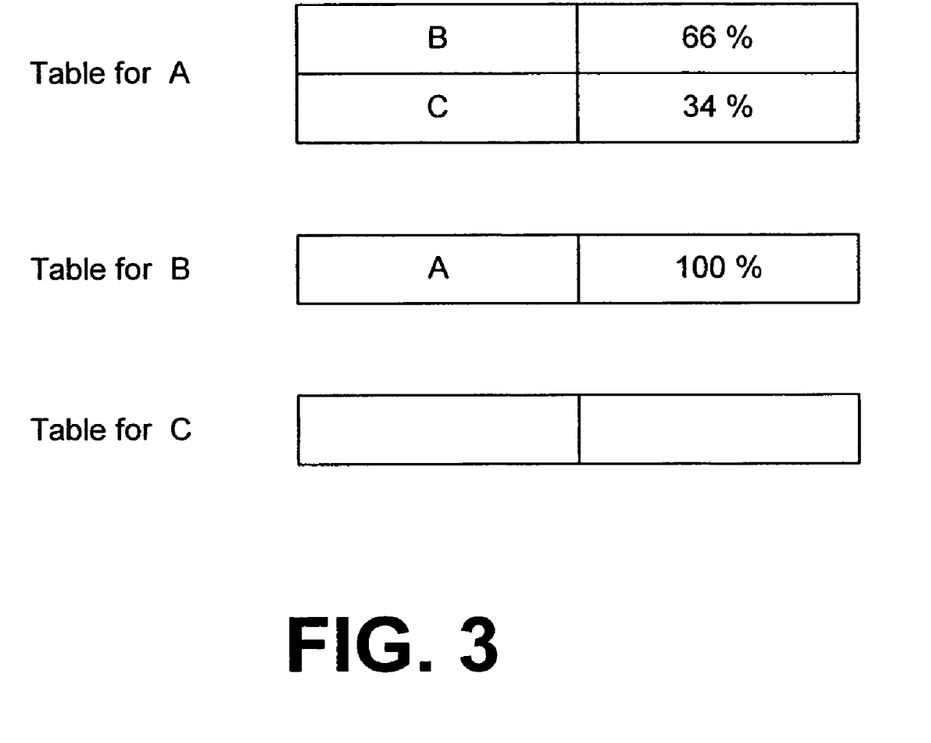
FIG. 3 shows three tables corresponding to three detected letters A, B, and C in corpus "ABABAC".

FIG. 3 shows the three tables corresponding to three detected letters A, B, and C in the above corpus. Since letter A has two different letters (i.e., B and C) following it, the table for A includes two letter entries B and C along with corresponding frequency numbers. In the given corpus, letter B follows letter A two out of three occurrences, while letter C follows letter A one out of three occurrences. Therefore, the frequency of occurrence number for letter sequence A-B is 66% while the frequency of occurrence number for letter sequence A-C is 34%. Tables for B and C can be generated similarly.

The technique described above is generally referred to as an "N-gram" technique. FIG. 3 illustrates a "bi-gram" example because the tables are generated for two-letter sequences. Tables showing 3-letter sequences would involve a "tri-gram" technique, and so on. In an alternative implementation, this type of tables can be used at the whole word level to predict what words likely follow other words in speech recognition, as a hint to the recognizer. These tables are then taken as the "Menu" of inputs for the word generator described above.

Figure 4:
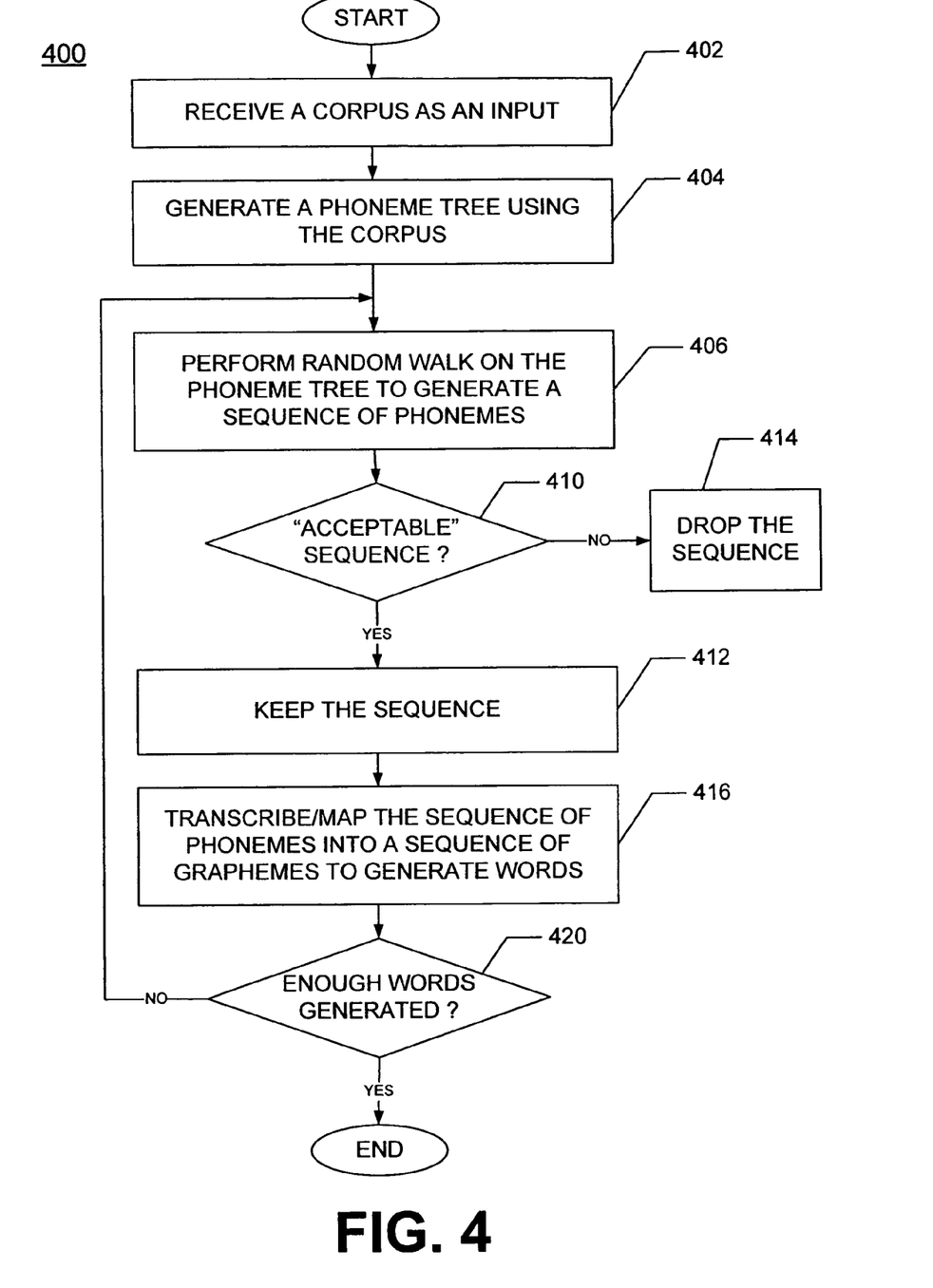
FIG. 4 shows a flowchart of one implementation of generating words and names using N-grams of phonemes.

FIG. 4 shows a flowchart 400 of one implementation of generating words and names using N-grams of phonemes. The flowchart 400 indicates that a corpus is initially received, at 402, as an input to the word generator. As mentioned above, the corpus should include a body of text that is fairly representative of the language in which words are generated. For example, in generating English words, the collected works of Shakespeare can be used as a corpus. In some implementations, more than one corpus can be used as inputs to the word generator. By selecting different sources to use as an input corpus, the types of words generated can be adjusted and controlled.

A phoneme tree is generated, at 404, using the received corpus, which provides an inventory of phonemes used to generate words and names. In one implementation, the phoneme tree generation is completely automatic and does not require user editing or modification or other manual aid in generation. In other implementations, varying levels of user interactivity are provided to allow a user a desired level of user customization.

The phoneme tree is generated by first generating a plurality of N-gram frequency tables or frequency trees of phonemes. Thus, the phoneme tree building process involves decomposing the corpus into a sequence of words, and decomposing the words into phonemes using a dictionary and/or a grapheme-to-phoneme decomposition technique. Phoneme-following-phoneme patterns are then encoded into the frequency tables or trees as N-grams. A frequency table or frequency tree includes all phonemes that follow a given phoneme and corresponding frequency of occurrence numbers indicating probability numbers for phonemes following a given phoneme. Accordingly, using a different input corpus generates a different phoneme tree.

For example, assuming the text "phoo basr blar foo" represents the entire corpus, the corpus is decomposed into sequence of words [phoo, basr, blar, foo], which are further decomposed into phonemes [[/f/, /U/] [/b/, /a/, /s/, /r/] [/b/, /l/, /a/, /r/] [/f/, /U/]]. In one implementation, the phonemes are then used to build a set of frequency tables as shown in FIG. 5.

Figure 5:
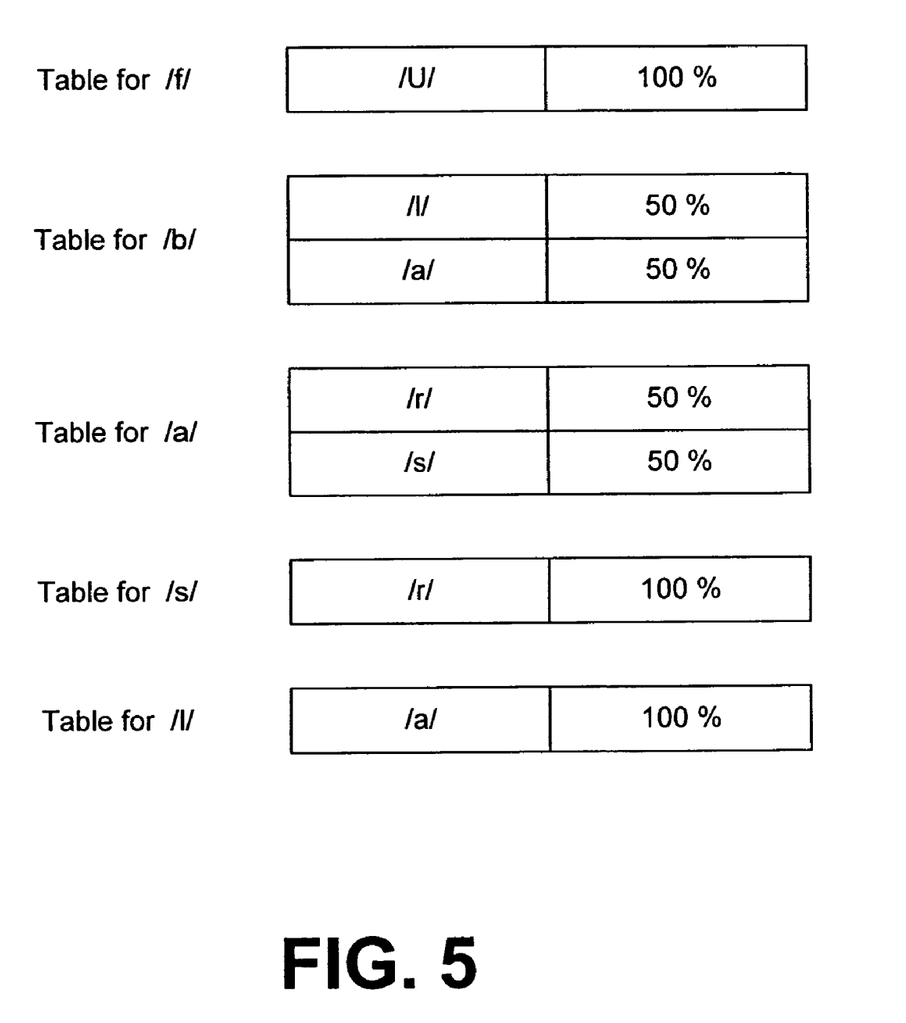
FIG. 5 shows five frequency tables corresponding to five non-terminal phonemes in corpus "phoo basr blar foo".

Referring to FIG. 5, five frequency tables corresponding to five non-terminal phonemes in the above corpus are shown. Since phoneme /f/ has only one phoneme (i.e., /U/) following it, the table for /f/ includes one entry along with corresponding frequency number, "100%". Since phoneme /b/ has two phonemes (i.e., /l/ and /a/) following it, the table for /b/ includes two entries along with corresponding frequency numbers. Phoneme /l/ follows phoneme /b/ in one out of two occurrences of phoneme /b/, while phoneme /a/ follows phoneme /b/ in one out of two occurrences of phoneme /b/. Therefore, the frequency of occurrence number for phoneme sequence /b/-/l/ is 50% while the frequency of occurrence number for phoneme sequence /b/-/a/ is also 50%. Tables for phonemes /a/, /s/, and /r/ can be generated similarly. Since phonemes /U/ and /r/ are terminal phonemes, no table exists for those phonemes.

Figure 6A:
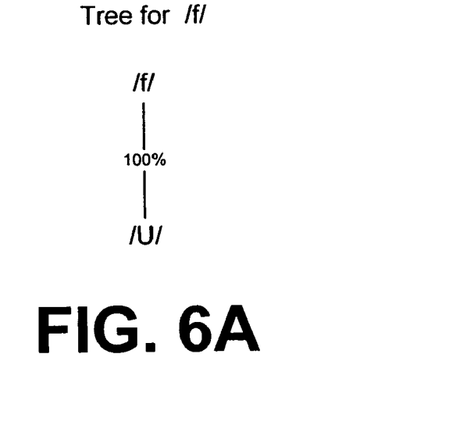
FIGS. 6A to 6E show five frequency trees corresponding to five frequency tables shown in FIG. 5.
Figure 6B:
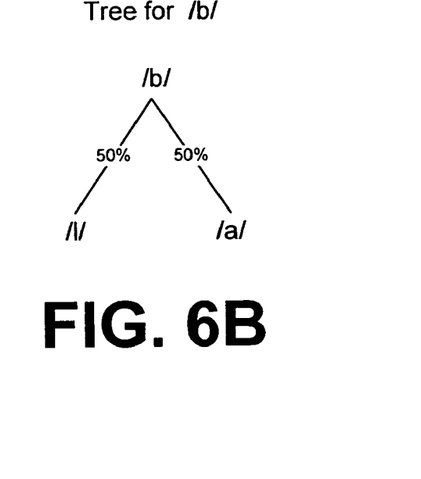
Figure 6C:
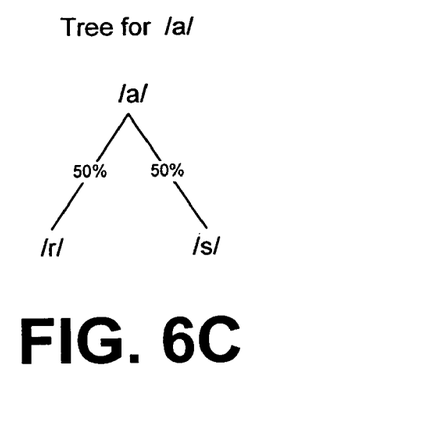
Figure 6D:
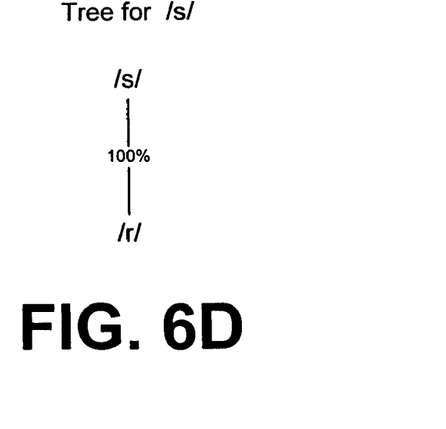
Figure 6E:
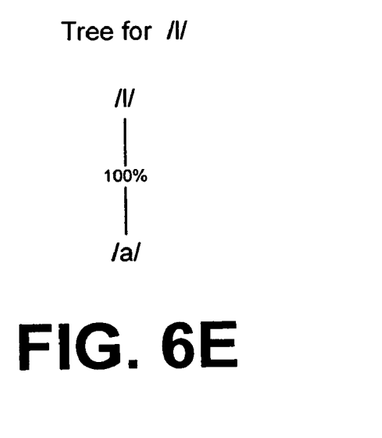

In an alternative implementation, frequency trees are built in place of frequency tables. For example, FIG. 6A shows a frequency tree for phoneme /f/; FIG. 6B shows a frequency tree for phoneme /b/; FIG. 6C shows a frequency tree for phoneme /a/; FIG. 6D shows a frequency tree for phoneme /s/; and FIG. 6E shows a frequency tree for phoneme /l/. In the frequency trees, the branches include frequency occurrence numbers for phonemes following a given phoneme. Thus, for example, in FIG. 6C, the frequency tree for phoneme /a/ shows the frequency occurrence number of 50% in the branch for phoneme /r/ and the frequency occurrence number of 50% in the branch for phoneme /s/.

Figure 7:
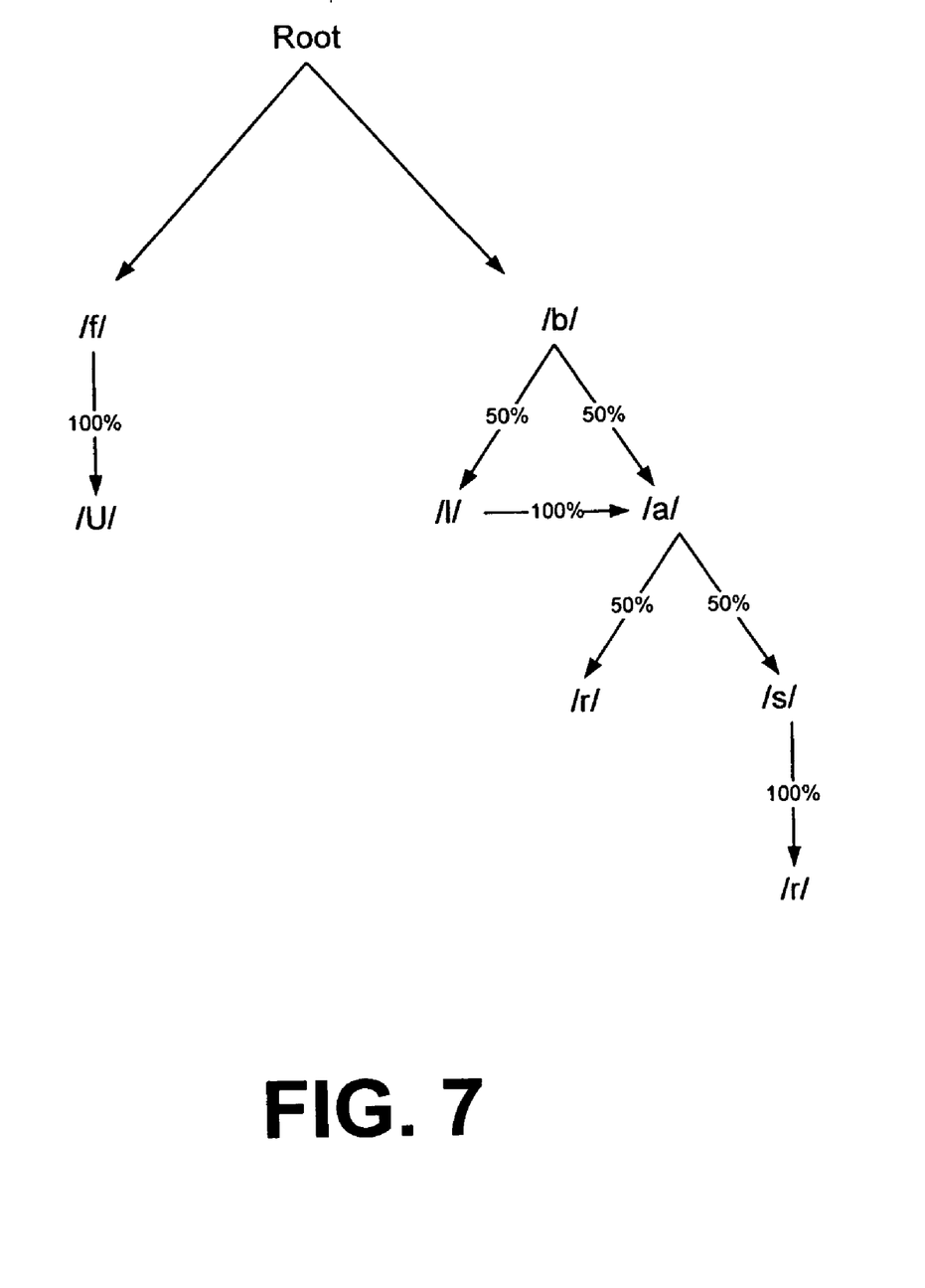
FIG. 7 illustrates one implementation of a phoneme tree generated from an inventory of phonemes built from a given corpus.

Finally, a phoneme tree is generated by combining the frequency tables or frequency trees in a phoneme-to-phoneme connection. FIG. 7 illustrates one implementation of a phoneme tree generated from an inventory of phonemes built from the given corpus. In the illustrated implementation of FIG. 7, the phoneme tree includes the two starting phonemes /f/ and /b/ as two nodes emanating from the root. The phoneme tree also includes two terminal phonemes /U/ and /r/ as leaves.

Referring back to FIG. 4, a random walk is performed on the generated phoneme tree, at 406, to generate a sequence of phonemes. To perform the random walk, a decision is made at each node of the phoneme tree to select a branch to follow in the path. The probability number of each branch weights the selection so that a branch with a higher probability number would be selected more often. Therefore, the decision at each node is equivalent to throwing a "loaded" die, which is loaded with determined probabilities for following phonemes.

At 410, a decision box determines whether the generated sequence of phonemes is an "acceptable" sequence. In one example, an "acceptable" sequence is a sequence of phonemes that is pronounceable and reasonable to the speaker of a given language. In another example, an "acceptable" sequence is a sequence of phonemes that meets certain standards such as phonestheme density described in co-pending U.S. patent application Ser. No. 11/102,519. If the sequence of phonemes is determined to be "acceptable", then the sequence is kept, at 412, to generate words and names. Otherwise, if the sequence of phonemes is determined to be "unacceptable", then the sequence is dropped, at 414.

The sequence of phonemes (i.e., sound strings) is then transcribed or mapped into a sequence of graphemes (i.e., a script), at 416, using a lookup table or other similar techniques to generate words and/or names. Accordingly, using the above-given corpus of text "phoo basr blar foo", possible resulting sequences of phonemes include [/f/ /U/], [/b/ /a/ /s/], and [/b/ /l/ /a/ /s/] but not [/r/ /U/ /f/] and [/b/ /a/ /s/ /a/].

If it is determined, at 420, that not enough words and/or names have been generated, then the random walk process is repeated, at 406, to generate another sequence of phonemes and, subsequently, more words and/or names. The boxes 406, 410, 412, 414 are repeated until enough words and/or names are generated. Otherwise, if enough words and/or names have been generated, then the process terminates.

Additionally, words and/or names can be checked against a list of "bad" words or chunks. The check against the list can be automated by "syllabifying" the input corpus and checking common features off the list. In one example, "bad" words include words that are profane or unpronounceable. In another example, "bad" chunks include a sequence of phonemes that are known not to be pleasing or pronounceable.

In practice, large bodies of text, such as the complete work of Shakespeare, produce large tables, where many phonemes follow many other phonemes, and the frequency of occurrences can fall below 1%. Thus, the N-gram tables are generally trimmed to substantially reduce low-frequency N-grams such as phoneme pairs which although present in the language are not "characteristic" or typical.

An alternative embodiment for generating words and/or names using N-grams of phonemes includes generating nonsense text that is phonologically valid in a given language. In one example, the nonsense text can be used for training speech recognition programs.

Another alternative embodiment for generating words and/or names using N-grams of phonemes includes operating the phoneme-based word generator at an even lower language unit level, such as phones. However, it is difficult to find reliable word-to-phone dictionaries or conversion techniques. As a result, the generated words and/or names may be too "granular", stringing together increasingly unusual sounds to form substantially alien-sounding words and/or names. However, this might be desirable in some cases.

One of the advantages of using N-grams of phonemes to generate words and/or names is that phonemes are substantially more flexible than letters because the resulting words are represented as sequences of sounds. Thus, this advantage provides other advantages including the forced inclusion or exclusion of sounds or parts of words, homonym checking, and so on.

Another advantage of using N-grams of phonemes to generate words and/or names is the ease of setting up the pronunciation checking. Since using the sequence of phonemes involves making sounds of the generated words and/or names available, a few further steps are used to configure the process for pronunciation checking.

For example, in one implementation, the pronunciation checking process includes "syllabifying" the word using a sonority technique, and checking each syllable to ensure that the syllable is a "legal" syllable, which includes shared, universal traits. In another implementation, the pronunciation checking process includes "syllabifying" the word using a sonority technique, and using a language-specific filter that substantially reduces "unusual" parts of words. For example, in English, a word that starts with /ng/ is eliminated.

Other advantages of phoneme-based (i.e., based on the sound of text) approach include: (1) fewer occurrences of unpronounceable names since each sound that follows another sound in the output has actually followed a sound in the input corpus or corpora; (2) manipulation by sound can be accomplished by the naming engine (phonesthemes, sound symbolism, etc.); (3) easier to predict whether a string of sounds, taken all together, is pronounceable; (4) more effective profanity filter because the sound filter can bypass spelling variation tricks; (5) less need to annotate first-middle-last units since legal and frequent opening and closing sounds can be inferred and recorded from the corpus or corpora; (6) easier to generate words/names that are appropriate for and based on alternate languages; and (7) since the words/names are coded as sounds, spelling (i.e., grapheme representation) of the words/names can vary according to custom, orthography, script, region, culture, or any other means.

Figure 8A:
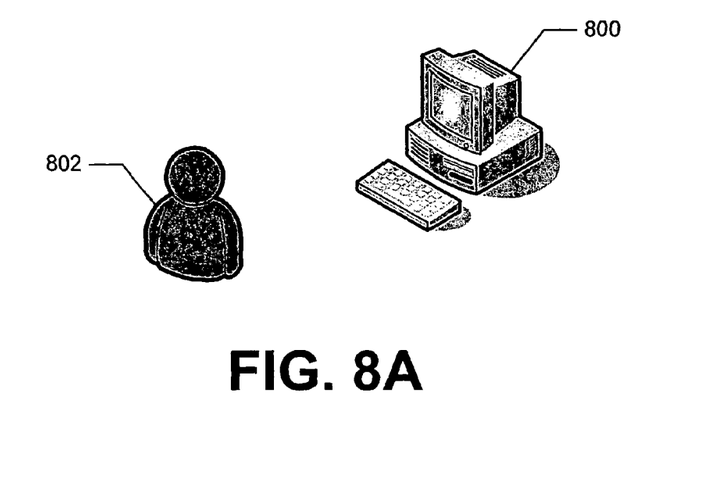
FIG. 8A shows a representation of a computer system and a user.

FIG. 8A shows a representation of a computer system 800 and a user 802. The user 802 can use the computer system 800 to generate words and/or names. In one example, a computer system stores and executes a word generating application program (a "word generator"). The word generator is designed to generate words and names using N-grams of phonemes as described above.

Figure 8B:
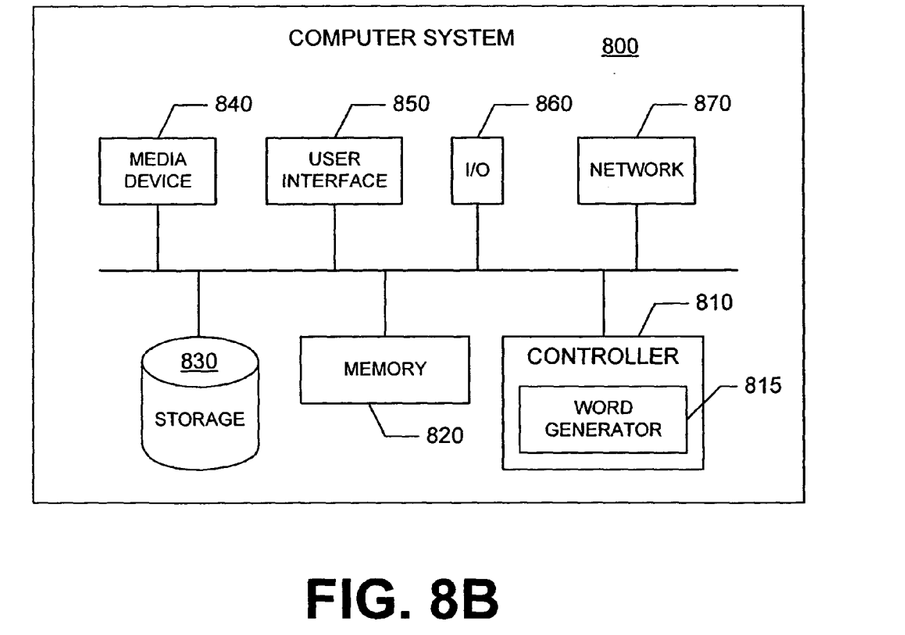
FIG. 8B shows a block diagram of one implementation of the computer system in FIG. 8A, including a word generator.

FIG. 8B shows a block diagram of one implementation of the computer system 800 in FIG. 8A, including a word generator. The computer system 800 includes a controller 810, a memory 820, storage 830, a media device 840, a user interface 850, an input/output (I/O) interface 860, and a network interface 870. These components are interconnected by a common bus 880. Alternatively, different connection configurations can be used, such as a star pattern with the controller at the center.

The controller 810 is a programmable processor and controls the operation of the computer system 800 and its components. The controller 810 loads instructions from the memory 820 or an embedded controller memory (not shown) and executes these instructions to control the system. In its execution, the controller 810 provides a word generator 815 as a software system. Alternatively, this service can be implemented as separate components in the controller 810 or the computer system 800. The word generator 815 generates words and names using an input corpora and a dictionary retrieved from storage 830.

Memory 820 stores data temporarily for use by the other components of the computer system 800. In one implementation, memory 820 is implemented as RAM. In one implementation, memory 820 also includes long-term or permanent memory, such as flash memory and/or ROM.

Storage 830 stores data temporarily or long term for use by the other components of the computer system 800, such as for storing inventory of phonemes and generated words. In one implementation, storage 830 is a hard disk drive. Storage 830 stores information for use by the word generator 815, such as language dictionaries (e.g., for phoneme availability and placement, for letters, characters, or symbols), or restriction dictionaries (e.g., cultural, country, and language restrictions for filtering based on cultural taboos, or legal restrictions to filter names for trademarks), and so on. Storage 830 also stores data and data structures generated by the word generator for future use, such as the frequency tables, frequency trees, and phoneme trees.

The media device 840 receives removable media and reads and/or writes data to the inserted media. In one implementation, the media device 840 is an optical disc drive.

The user interface 850 includes components for accepting user input from a user of the computer system 800 and presenting information to the user. In one implementation, the user interface 850 includes a keyboard, a mouse, audio speakers, and a display. The controller 810 uses input from the user to adjust the operation of the computer system 800.

The I/O interface 860 includes one or more I/O ports to connect to corresponding I/O devices, such as external storage or supplemental devices (e.g., a printer or a PDA). In one implementation, the ports of the I/O interface 860 include ports such as: USB ports, PCMCIA ports, serial ports, and/or parallel ports. In another implementation, the I/O interface 860 includes a wireless interface for communication with external devices wirelessly. The network interface 870 includes a wired and/or wireless network connection, such as an RJ-45 or "Wi-Fi" interface (802.11) supporting an Ethernet connection.

The computer system 800 includes additional hardware and software typical of computer systems (e.g., power, cooling, operating system), though these components are not specifically shown in FIG. 8B for simplicity. In other implementations, different configurations of the computer system can be used (e.g., different bus or storage configurations or a multi-processor configuration).

Various implementations of the invention are realized in electronic hardware, computer software, or combinations of these technologies. Some implementations include one or more computer programs executed by a programmable processor or computer. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description focuses on implementations of the word generator using a single input corpus, more than one corpus may be used as input simultaneously. Moreover, the input corpora can even be in different languages, causing a "blend" effect, which may be useful for creating new fantasy languages. Accordingly, the present invention is not limited to only those implementations described above.

What is claimed is:

1. A method for generating words and/or names, comprising:

receiving, by a processor, at least one corpus based on a given language, the corpus being digitally stored in a computer readable media;

generating a plurality of N-grams of phonemes and a plurality of frequencies of occurrence using said at least one corpus, wherein said generating a plurality of N-grams of phonemes includes generating a plurality of N-gram frequency tables of phonemes by decomposing said at least one corpus into a sequence of words, and decomposing the sequence of words into the plurality of N-grams of phonemes, and wherein each frequency of occurrence within the plurality of frequencies of occurrence corresponds to a respective pair of first and second phonemes within the plurality of N-grams of phonemes and indicates the frequency of the second phoneme in the pair following the first phoneme in the pair;

generating a phoneme tree using said plurality of N-grams of phonemes and said plurality of frequencies of occurrence;

storing said phoneme tree in a digital storage device, performing a random walk on said phoneme tree using said frequencies of occurrence to generate a sequence of phonemes;

mapping said sequence of phonemes into a sequence of graphemes to generate words and/or names;

wherein said phoneme tree is configured with a root at the top and a plurality of nodes emanating from said root, said plurality of nodes connected in such a way that a pair of connected nodes are connected by a path from the first node in the pair to the second node in the pair, wherein a pair of connected nodes corresponds to a pair of phonemes having a corresponding frequency of occurrence, so that the first node in a pair of nodes represents the first phoneme in the corresponding pair of phonemes, the second node in that pair of nodes represents the second phoneme in that pair of phonemes, and the path connecting the nodes of that pair of nodes represents the frequency of occurrence.

2. The method of claim 1, wherein said performing a random walk on said phoneme tree includes
selecting a set of connected paths through said phoneme tree by randomly selecting at a node a path from that node based on the frequency of occurrence for that path.

3. The method of claim 1, wherein said generating a plurality of N-grams of phonemes includes generating a plurality of N-gram frequency trees of phonemes.

4. The method of claim 3, wherein generating a phoneme tree includes
combining said plurality of N-gram frequency trees of phonemes in a phoneme-to-phoneme connection.

5. The method of claim 1, wherein said decomposing said sequence of words includes
decomposing said sequence of words into said sequence of phonemes using a dictionary.

6. The method of claim 1, wherein said decomposing said sequence of words includes
decomposing said sequence of words into said sequence of phonemes using a grapheme-to-phoneme decomposition technique.

7. The method of claim 1, further comprising
determining whether said generated sequence of phonemes is pronounceable and reasonable to the speaker of said given language.

8. The method of claim 1, wherein said mapping said sequence of phonemes into a sequence of graphemes includes
transcribing said sequence of phonemes into said sequence of graphemes using a lookup table.

9. The method of claim 1, further comprising
forming words and/or names from said sequence of graphemes.

10. The method of claim 1, wherein said generating a plurality of N-grams of phonemes and a plurality of frequencies of occurrence using said at least one corpus and said generating a phoneme tree are configured to be substantially automatic without requiring user editing, modification, or other manual aid.

11. The method of claim 1, wherein said generating a plurality of N-grams of phonemes and a plurality of frequencies of occurrence using said at least one corpus and said generating a phoneme tree are configured to generate a unique phoneme tree, such that using a different corpus produces a different phoneme tree.

12. An apparatus for generating words and/or names, comprising:
means for receiving at least one corpus based on a given language;
first means for generating a plurality of N-grams of phonemes and a plurality of frequencies of occurrence using said at least one corpus,
wherein said first means for generating a plurality of N-grams of phonemes includes a third means for generating a plurality N-gram frequency tables of phonemes by decomposing said least one corpus into a sequence of words, and decomposing the sequence of words into the plurality of N-grams of phonemes, and
wherein each frequency of occurrence within the plurality of frequencies of occurrence corresponds to a respective pair of phonemes within the plurality of N-grams of phonemes and indicates the frequency of a second phoneme in the pair following a first phoneme in the pair;
second means for generating a phoneme tree using said plurality of N-grams of phonemes and said plurality of frequencies of occurrence;
means for performing a random walk on said phoneme tree using said frequencies of occurrence to generate a sequence of phonemes;
means for mapping said sequence of phonemes into a sequence of graphemes to generate words and/or names;
wherein said phoneme tree is configured with a root at the top and a plurality of nodes emanating from said root, said plurality of nodes connected in such a way that a pair of connected nodes are connected by a path from the first node in the pair to the second node in the pair,
wherein a pair of connected nodes corresponds to a pair of phonemes having a corresponding frequency of occurrence, so that the first node in a pair of nodes represents the first phoneme in the corresponding pair of phonemes, the second node in that pair of nodes represents the second phoneme in that pair of phonemes, and the path connecting the nodes of that pair of nodes represents the frequency of occurrence.

13. The apparatus of claim 12, wherein said means for performing a random walk on said phoneme tree includes
means for selecting a set of connected paths through said phoneme tree by randomly selecting at a node a path from that node based on the frequency of occurrence for that path.

14. The apparatus of claim 12, wherein said first means for generating a plurality of N-grams of phonemes includes
third means for generating a plurality of N-gram frequency trees of phonemes.

15. The apparatus of claim 14, wherein said second means for generating a phoneme tree includes
means for combining said plurality of N-gram frequency trees of phonemes in a phoneme-to-phoneme connection.

16. The apparatus of claim 12, wherein said second means for decomposing said sequence of words includes
means for decomposing said sequence of words into said sequence of phonemes using a dictionary.

17. The apparatus of claim 12, wherein said second means for decomposing said sequence of words includes
means for decomposing said sequence of words into said sequence of phonemes using a grapheme-to-phoneme decomposition technique.

18. The apparatus of claim 12, wherein said means for performing a random walk on the phoneme tree includes
means for selecting a path to a following phoneme at a node of the phoneme tree from a plurality of paths based on said corresponding plurality of frequency of occurrences for said plurality of paths.

19. The apparatus of claim 12, further comprising
means for determining whether said generated sequence of phonemes is pronounceable and reasonable to the speaker of said given language.

20. The apparatus of claim 12, wherein said means for mapping said sequence of phonemes into a sequence of graphemes includes
means for transcribing said sequence of phonemes into said sequence of graphemes using a lookup table.

21. The apparatus of claim 12, further comprising means for forming words and/or names from said sequence of graphemes.

22. The apparatus of claim 12, wherein said means for generating a plurality of N-grams of phonemes and a plurality of frequencies of occurrence using said at least one corpus and said means for generating a phoneme tree are configured to be substantially automatic without requiring user editing, modification, or other manual aid.

23. The apparatus of claim 12, wherein said means for generating a plurality of N-grams of phonemes and a plurality of frequencies of occurrence using said at least one corpus and said means for generating a phoneme tree are configured to generate a unique phoneme tree, such that using different corpus produces different phoneme tree.

24. An apparatus for generating words and/or names, comprising:
an input/output interface to receive at least one corpus based on a given language;
a processor configured to decompose said at least one corpus into a sequence of words, to generate a plurality of N-grams of phonemes and a plurality of frequencies of occurrence using said sequence of words and a dictionary,
wherein generating a plurality of N-grams of phonemes includes generating a plurality of N-gram frequency tables of phonemes by decomposing said least one corpus into a sequence of words, and decomposing the sequence of words into the plurality of N-grams of phonemes, and
wherein each frequency of occurrence within the plurality of frequencies of occurrence corresponds to a respective pair of phonemes within the plurality of N-grams of phonemes and indicates the frequency of a second phoneme in the pair following a first phoneme in the pair, and to generate a phoneme tree using said plurality of N-grams of phonemes and said plurality of frequencies of occurrence;
a storage for storing said dictionary, said phoneme tree, and a phoneme-to-grapheme lookup table,
wherein said phoneme tree is configured with a root at the top and a plurality of nodes emanating from said root, said plurality of nodes connected in such a way that a pair of connected nodes are connected by a path from the first node in the pair to the second node in the pair,
a pair of connected nodes in said phoneme tree corresponds to a pair of phonemes having a corresponding frequency of occurrence, so that the first node in a pair of nodes represents the first phoneme in the corresponding pair of phonemes, the second node in that pair of nodes represents the second phoneme in that pair of phonemes, and the path connecting the nodes of that pair of nodes represents the frequency of occurrence, and
said processor retrieving said phoneme tree to:
perform a random walk on said phoneme tree using said frequencies of occurrence to generate a sequence of phonemes; and
maps said sequence of phonemes into a sequence of graphemes using said phoneme-to-grapheme lookup table to generate words and/or names.

25. A computer program, stored in a non-transitory storage medium, for generating words and/or names, the program comprising executable instructions that cause a computer to:
receive at least one corpus based on a given language;
generate a plurality of N-grams of phonemes and a plurality of frequencies of occurrence using said at least one corpus,
wherein to generate a plurality of N-grams of phonemes includes generating a plurality N-gram frequency tables of phonemes by decomposing said least one corpus into a sequence of words, and decomposing the sequence of words into the plurality of N-grams of phonemes, and
wherein each frequency of occurrence within the plurality of frequencies of occurrence corresponds to a respective pair of phonemes within the plurality of N-grams of phonemes and indicates the frequency of a second phoneme in the pair following a first phoneme in the pair;
generate a phoneme tree using said plurality of N-grams of phonemes and said plurality of frequencies of occurrence;
perform a random walk on said phoneme tree using said frequencies of occurrence to generate a sequence of phonemes;
map said sequence of phonemes into a sequence of graphemes to generate words and/or names;
wherein said phoneme tree is configured with a root at the top and a plurality of nodes emanating from said root, said plurality of nodes connected in such a way that a pair of connected nodes are connected by a path from the first node in the pair to the second node in the pair,
wherein a pair of connected nodes corresponds to a pair of phonemes having a corresponding frequency of occurrence, so that the first node in a pair of nodes represents the first phoneme in the corresponding pair of phonemes, the second node in that pair of nodes represents the second phoneme in that pair of phonemes, and the path connecting the nodes of that pair of nodes represents the frequency of occurrence.

26. The computer program of claim 25, wherein executable instructions that cause a computer to perform a random walk on said phoneme tree includes executable instructions that cause a computer to
select a set of connected paths through said phoneme tree by randomly selecting at a node a path from that node based on the frequency of occurrence for that path.

27. The computer program of claim 25, wherein executable instructions that cause a computer to generate a plurality of N-grams of phonemes further includes executable instructions that cause a computer to
generate a plurality of N-gram frequency trees of phonemes.

28. The computer program of claim 27, wherein executable instructions that cause a computer to generate a phoneme tree further includes executable instructions that cause a computer to
combine said plurality of N-gram frequency trees of phonemes in a phoneme-to-phoneme connection.

29. The computer program of claim 25, wherein executable instructions that cause a computer to decompose said sequence of words further includes executable instructions that cause a computer to
decompose said sequence of words into said sequence of phonemes using a dictionary.

30. The computer program of claim 25, wherein executable instructions that cause a computer to decompose said sequence of words further includes executable instructions that cause a computer to
decompose said sequence of words into said sequence of phonemes using a grapheme-to-phoneme decomposition technique.

31. The computer program of claim 25, further comprising executable instructions that cause a computer to
determine whether said generated sequence of phonemes is pronounceable and reasonable to the speaker of said given language.

32. The computer program of claim 25, wherein executable instructions that cause a computer to map said sequence of phonemes into a sequence of graphemes further includes executable instructions that cause a computer to
transcribe said sequence of phonemes into said sequence of graphemes using a lookup table.

33. The computer program of claim 25, further comprising executable instructions that cause a computer to
form words and/or names from said sequence of graphemes.

* * * * *